US009660756B2

(12) United States Patent
Dahlfort et al.

(10) Patent No.: US 9,660,756 B2
(45) Date of Patent: May 23, 2017

(54) METHOD FOR SPLIT SPECTRUM SIGNALLING IN AN OPTICAL NETWORK

(75) Inventors: Stefan Dahlfort, Santa Clara, CA (US); Daniele Ceccarelli, Genoa (IT); Ming Xia, Milpitas, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 29 days.

(21) Appl. No.: 13/881,667

(22) PCT Filed: May 16, 2012

(86) PCT No.: PCT/SE2012/050535
§ 371 (c)(1),
(2), (4) Date: Apr. 25, 2013

(87) PCT Pub. No.: WO2013/162433
PCT Pub. Date: Oct. 31, 2013

(65) Prior Publication Data
US 2014/0205296 A1    Jul. 24, 2014

Related U.S. Application Data

(60) Provisional application No. 61/637,305, filed on Apr. 24, 2012.

(51) Int. Cl.
*H04J 14/02* (2006.01)
*H04Q 11/02* (2006.01)

(52) U.S. Cl.
CPC ...... *H04J 14/0267* (2013.01); *H04J 14/0224* (2013.01); *H04J 14/0257* (2013.01);
(Continued)

(58) Field of Classification Search
None
See application file for complete search history.

(56) References Cited

U.S. PATENT DOCUMENTS

| 2012/0002550 A1* | 1/2012 | Cugini et al. | 370/238 |
| 2012/0201541 A1* | 8/2012 | Patel et al. | 398/58 |

(Continued)

FOREIGN PATENT DOCUMENTS

| CN | 1713558 A | 12/2005 | |
| EP | 2640086 | * 12/2011 | H04Q 11/00 |

(Continued)

OTHER PUBLICATIONS

Hussain et al: Generalized Label for Super-Channel Assignment on Flexible Gri; draft-hussain-ccamp-super-channel-label-02.txt, IETF, Oct. 31, 2011, pp. 1-15.*

(Continued)

*Primary Examiner* — Li Liu
(74) *Attorney, Agent, or Firm* — Rothwell, Figg, Ernst & Manbeck, P.C.

(57) ABSTRACT

The example embodiments presented herein are directed towards an Optical Network Element, ONE, node (14), and corresponding method therein, for establishing multiple spectral routing in an optical transport network. The establishment of the multiple spectral routing features the use of a Split-Spectrum Label, SSL, (11) which comprises multiple definitions for spectral slots, where each definition has an absolute starting and an absolute ending frequency allocation.

17 Claims, 5 Drawing Sheets

| 3 bits | 4 bits | 9 bits | 16 bits |
|---|---|---|---|
| Grid | C.S | ID | n |

Additional slot width parameters

C.S: Carrier Spacing

ID: The identifier field in the flexible label format is left unmodified compared with [RFC6205]. It is defined to distinguish which transmitter is used to carry the lambda. This identifier only has a local significance that should be indicated in the signaling message for LSP establishment. For routing information flooding, this field is meaningless and should be ignored on receipt.

n: Integer. This field is used to compute the nominal center frequency/wavelength of the channel.

Additional slot width parameters: The slot width parameters field is mandatory only when Grid is set to 3 for flexible grid condition. These 5 bits field are used to represent how many slot width granularity the label has occupied. As the granularity is defined to be twice of the channel spacing granularity, so the slot width is calculated to be m * 2 * C.S..

| Grid | Reserved | ITU-T DWDM | ITU-T CWDM | Flex DWDM | Future Use |
|---|---|---|---|---|---|
| Value | 0 | 1 | 2 | 3 | 4-7 |

| C.S [GHz] | Reserved | 100 | 50 | 25 | 12.5 | 6.25 | Future use |
|---|---|---|---|---|---|---|---|
| Value | 0 | 1 | 2 | 3 | 4 | 5 | 6-15 |

(52) U.S. Cl.
CPC .......... *H04J 14/0258* (2013.01); *H04Q 11/02* (2013.01); *H04J 14/026* (2013.01)

(56) References Cited

U.S. PATENT DOCUMENTS

| | | | |
|---|---|---|---|
| 2013/0028602 A1* | 1/2013 | Fu et al. | 398/58 |
| 2013/0084075 A1* | 4/2013 | Hussain et al. | 398/141 |
| 2013/0121685 A1* | 5/2013 | Rao et al. | 398/17 |
| 2013/0230316 A1* | 9/2013 | Hussain et al. | 398/34 |
| 2013/0308945 A1* | 11/2013 | Dhillon et al. | 398/48 |

FOREIGN PATENT DOCUMENTS

| | | | | |
|---|---|---|---|---|
| RU | 2384944 C2 | 3/2010 | | |
| WO | 2008005018 A2 | 1/2008 | | |
| WO | WO 2010104434 A1 * | 9/2010 | ............. | H04L 12/56 |
| WO | 2010137004 A1 | 12/2010 | | |
| WO | WO 2013034201 A1 * | 3/2013 | ............. | H04J 14/02 |

OTHER PUBLICATIONS

Zhang et al: RSVP-TE Signaling Extensions in support of Flexible Grid; draft-zhang-ccamp-flexible-grid-rsvp-te-ext-00.txt, IETF, Oct. 16, 2011.*
Shen et al "From Coarse Grid to Mini-Grid to Gridless: How Much can Gridless Help Contentionless", OFC 2011,Mar. 6-10, 2011, paper OTuI3, pp. 1-3.*
Syed et al: "A Framework for control of Flex Grid Networks draft-syed-ccamp-flexgrid-framework-ext-00.txt", IETF, Mar. 5, 2012, pp. 1-13.*
Gringeri et al, "Flexible Architectures for Optical Transport Nodes and Networks", IEEE Communications Magazine, Jul. 2010, pp. 40-50.*
Jinno et al., "Spectrum-Efficient and Scalable Elastic Optical Path Network: Architecture, Benefits and Enabling Technologies", IEEE Comm. Mag., Nov. 2009, pp. 66-73.*
International Preliminary Report on Patentability, issued in corresponding International Application No. PCT/EP2012/050535, dated Jul. 24, 2014, 22 pages.
Gerber et al. "Traffic Types and Growth in Backbone Networks" AT&T Labs—Research, OFC 2011, 3 pages.
Common Control and Measurement Plane (ccamp)—Charter, printed from http://datatracker.ietf.org/wg/ccamp/charter, 2013, 4 pages.
Li et al. "Fexibe Grid Label Format in Wavelength Switched Optical Network" draft-li-ccamp-flexible-grid-label-00, 2011, 10 pages.
Hussain et al. "Generalized Label for Super-Channel Assignment on Flexible Grid; draft-hussain-ccamp-super-channel-label-03.txt" Internet Engineering Task Force, IETF, 2012, 15 pages.
Zhang et al. "RSVP-TE Signaling Extensions in support of Flexible Grid; draft-zhang-ccamp-flexible-grid-rsvp-te-ext-01.txt" Internet Engineering Task Force, IETF, 2012, 15 pages.
Syed et al. "A Framework for control of Flex Grid Networks; draft-syed-ccamp-flexgrid-framework-ext-01.txt" Internet Engineering Task Force, IETF, 2012, 17 pages.
Zhang et al. "Requirements for GMPLS Control of Flexible Grids; draft-zhang-ccamp-flexible-grid-requirements-01.txt" , Internet Engineering Task Force, IETF, 2011, 16 pages.
Official Action dated Feb. 17, 2016, in connection with Russian Patent Application No. 2014146943/07(075607), 7 pages.
Chinese Office Action issued in Application No. 201280072615.4 dated Jan. 22, 2017, 8 pages.
Iftekhar Hussain et al., "Generalized Label for Super-Channel Assignment on Flexible Grid", draft-hussain-ccamp-super-channel-label-02.txt (Oct. 31, 2011), Network Working Group, 15 pages.
Fatai Zhang et al., "RSVP-TE Signaling Extensions in support of Flexible Grid", draft-zhang-ccamp-flexible-grid-rsvp-te-ext-00.txt (Oct. 16, 2011), Network Working Group, 12 pages.
Gangxiang (Steven) Shen et al., Qi Yang, "From Coarse Grid to Mini-Grid to Gridless: How Much can Gridless Help Contentionless?", ©Optical Society of America (2011), 3 pages.

* cited by examiner

METHOD FOR SPLIT SPECTRUM SIGNALLING IN AN OPTICAL NETWORK

CROSS REFERENCE TO RELATED APPLICATION(S)

This application is a 35 U.S.C. §371 National Phase Entry Application from PCT/SE2012/050535, filed May 16, 2012, designating the United States, and also claims the benefit of U.S. Provisional Application No. 61/637,305, filed Apr. 24, 2012. The disclosures of both applications are incorporated herein in their entirety by reference.

TECHNICAL FIELD

Example embodiments presented herein are directed towards an optical network element, and corresponding method therein, for establishing multiple spectral routing in an optical transport network with the use of a split-spectrum label comprising a plurality of entries. Each entry of the split spectrum label defines a spectrum slot comprising an absolute end and an absolute beginning frequency.

BACKGROUND

The focus for DWDM transport systems has since the instruction in the mid 1990's been on increasing the bitrate per wavelength channel, the transmission distance and reducing costs. As the capacity per wavelength channel has steadily increased, the issue of spectral use has become increasingly important.

Firstly, this is due to the so-called ITU grid which divides the transmission spectrum into 100 GHZ or 50 GHz slots. Thus, if you want to upgrade a 10 Gbps channel on a 50 GHz slot to 100 Gbps, the 100 G signal needs to be much more spectral efficient per bit versus the 10 G channel.

Secondly, as the total traffic demand of the DWDM transport system increases, while new fibers are not deployed, the spectrum available for the growing traffic becomes limited, and overall spectral efficiency becomes an issue. A typical estimate for the annual backbone traffic increase is 30% per year, or 10 times in 10 years.

Thus, in the last couple of years, the field of elastic optical networks has been born. The idea is to allocate as little spectrum as possible to each traffic demand. The traffic demand is an element on the network traffic matrix between two end nodes. For demands having short transmission distances and few node hops, the needed spectrum can be made smaller by some modulation scheme with a higher value of bits/symbol (e.g., more bits per Hertz) at the same symbol rate, with less effect of filter narrowing from node cascades.

Tightly connected to any optical transport technology are the control plane and the ability to set up new connections in the network using signaling. In the IETF GMPLS framework, each connection, or path, is associated with a label, uniquely identifying the path in the network. In the IETF RFC6205, a WDM label is outlined, having information on the WDM grid and the carrier frequency of the wavelength channel.

SUMMARY

At least one object of the example embodiments presented herein is to provide an improved method of spectrum allocation. Thus, some of the example embodiments presented herein are directed towards the use of a split spectrum label featuring a number of entries, where each entry may define a spectral slot. The spectral slots may be defined by an absolute beginning and ending. Thus, at least one example advantage of the embodiments presented herein is that the split spectrum labels and absolute ending and beginning definitions of the spectral slots improve spectrum allocation by facilitating signaling for a single connection with multiple spectrum components in an optical network. Furthermore, another example advantage of the example embodiments presented herein is to enable efficient label allocation to these spilt spectrum connections. This avoids the use of multiple labels for a spilt spectrum connection and makes connection set-up, tear down, re-arrangement, etc., more efficient and reduces system complexity.

Thus, some of the example embodiments may be directed towards a method, in an Optical Network Element (ONE) node for establishing multiple spectral routing in an optical transport network. The method comprises receiving, from a Path Computation Engine (PCE) a Split-Spectrum Label (SSL). The SSL comprises a plurality of entries and a plurality of definitions for spectral slots. Each entry defines a spectrum slot comprising an absolute starting and an absolute ending frequency allocation. The method further comprises establishing a plurality of optical routes, where each optical route corresponds to one spectrum slot defined by a respective entry, of the plurality of entries, of the received SSL.

Some of the example embodiments may be directed towards an Optical Network Element (ONE) node for establishing multiple spectral routing in an optical transport network. The ONE node comprises receiving circuitry configured to receive, from a Path Computation Engine (PCE) a Split-Spectrum Label (SSL). The SSL comprises a plurality of entries and a plurality of definitions for spectral slots, where each entry defines a spectrum slot comprising an absolute starting and an absolute ending frequency allocation. The ONE node further comprises processing circuitry configured to establish a plurality of optical routes, wherein each optical route corresponds to one spectrum slot defined by a respective entry, of the plurality of entries, of the received SSL.

DEFINITIONS

DWDM Dense Wavelength Division Multiplexing
GMPLS Generalized Multi-Protocol Label Switching
IETF Internet Engineering Task Force
ITU International Telecom Union
ITU-T ITU Telecommunication Standardization Sector
ONE Optical Network Element
PCE Path Computation Engine
RSA Routing and Spectrum Assignment
SL Spectrum Label
SSL Split-Spectrum Label
WDM Wavelength Division Multiplexing

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
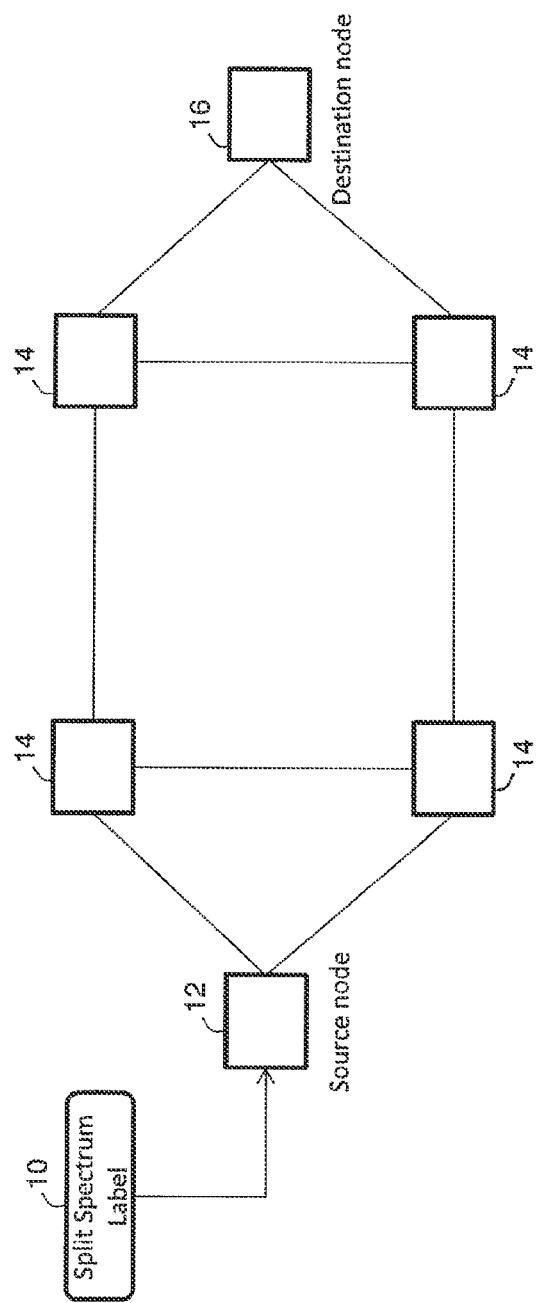
FIG. 1 is an illustrative example of an optical transport network.

As part of the development of the example embodiments described herein, a problem will first be identified and discussed. FIG. 1 illustrates a simplified example of an optical transport network. Typically, a spectrum label (SL) 10 may be provided by a path Computation Engine (PCE).

Figure 2:
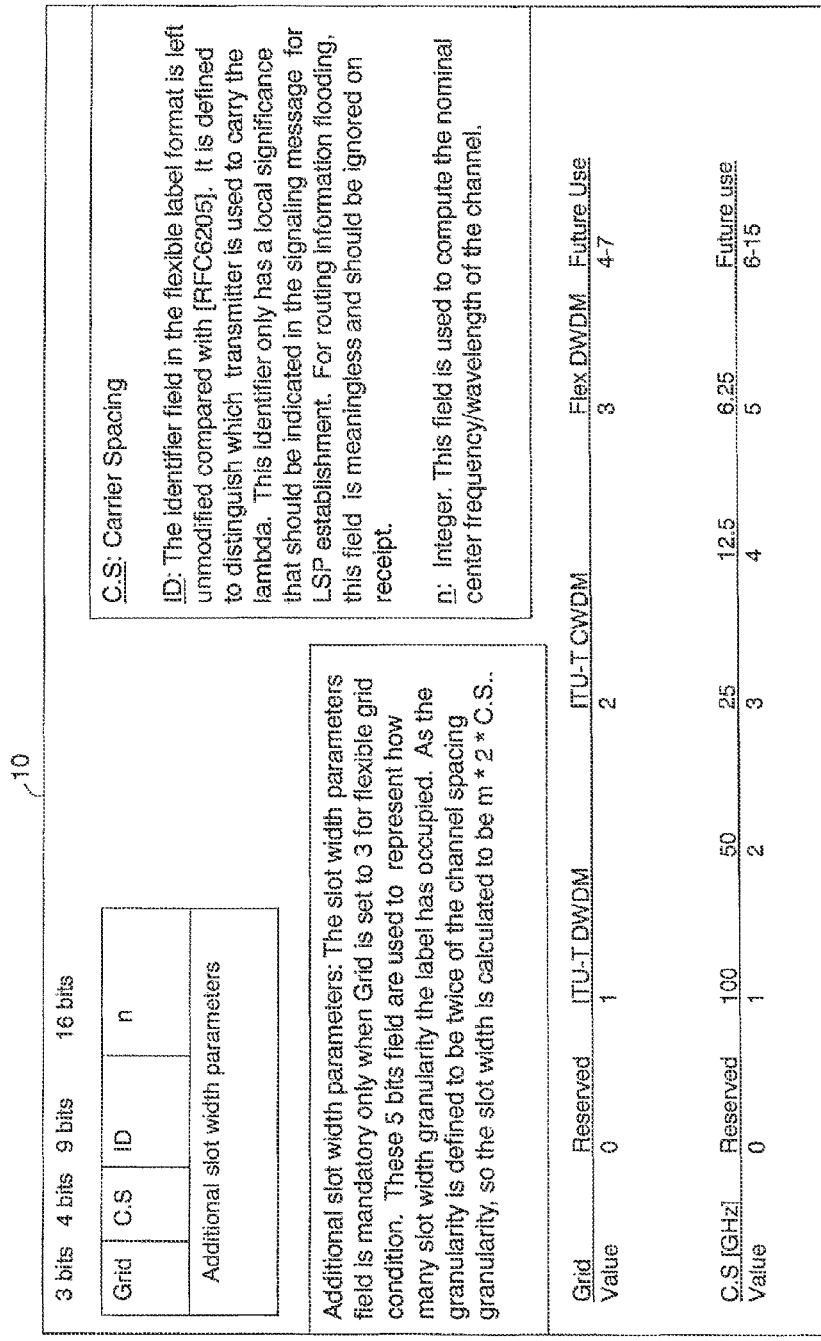
FIG. 2 is an example of a spectrum label.

FIG. 2 illustrates an example of the SL 10. The SL 10 comprises information for a transmitter or source node 12 to provide the necessary conditions for transmission. For example, SL 10 comprises information regarding the nominal center/frequency of the channel. It should be appreciated that the nominal center/frequency is not an exact or precise value but is instead an approximation. The SL 10 also comprises a carrier spacing or slot width, which is generally provided by the equation 12.5 GHz*m, where m is a positive integer.

The SL 10 of FIG. 2 defines a central frequency by shifting from a start frequency of 193.1 THz with multiple integral "channel spacings", which can be 12.5, 25, 50, or 100 GHz. SL 10 further defines a slot width by indicating multiple integer unit width, which is 12.5 GHz. This spectrum definition is based on grid and unit spectrum width (e.g., defined in [RFC6205]).

Upon receiving the SL 10, the source node 12 may thereafter establish an optical route and transmit an optical signal according to the specifications comprised in the SL 10. The optical signal may be routed with the use of any number of intermediate nodes 14 until reaching a final destination node 16.

It should be appreciated that the SL 10 of FIG. 2 defines the optical channel via a central frequency/wavelength. Thus, the defined optical channel does not comprise an absolute starting and/or ending frequency/wavelength. Furthermore, it is not possible to determine an absolute starting and/or ending frequency/wavelength since the nominal center provided in the SL 10 is not an exact or absolute value.

Two specific examples of SL 10 creation and use according to the current solutions will now be discussed. The first example is provided by 'draft-farrkingel-ccamp-flexigrid-lambda-label-01.txt' which is supplied by http://tools.ietf.org/id/draft-farrkingel-ccamp-flexigrid-lambda-label-01.txt. In this example, a finer grid of 6.25 GHz is defined, and "Frequency (THz)=193.1 THz+n*channel spacing (THz)" is proposed to be used to express the central frequency. Furthermore, a "Slot Width (GHz)=12.5 GHz*m" is proposed to express the slot width (spectrum width). In this draft, there is no means describing how to deal with the case that a single connection taking multiple non-consecutive spectrum slots.

The second example is provided by 'draft-zhang-ccamp-flexible-grid-rsvp-te-ext-00.txt' which is supplied by 'http://tools.ietf.org/id/draft-zhang-ccamp-flexible-grid-rsvp-te-ext-00.txt'. In this example, a finer grid of 6.25 GHz and an RSA method for signaling is proposed. Here, "Frequency (THz)=193.1 THz+n*channel spacing (THz)" is also used to express the central frequency. "Slot Width (GHz)=12.5 GHz*m" is used to express the slot width (spectrum width). Furthermore, this draft also includes a method for distributed RSA. The basic idea is:

1. Compute a path by egress node or PCE;
2. Make a set of all available spectrum slots on next link, and this set is sent by the current node to the next node;
3. Receive the spectrum set from the previous node, the current node computes a common set with the set for its next link;
4. Iterate steps 2 and 3, until the egress node is reached;
5. The egress node selects one spectrum slot from the final set.

Utilizing the information and the label format provided by SL 10, a single connection is represented by a single label. Thus, using SL 10, multiple spectral components requires multiple respective labels. Furthermore, due to the approximation of the nominal center, off-grid solutions are not possible and therefore the opportunities for channel assignment are limited.

Thus, example embodiments presented herein are directed towards a split spectrum label (SSL) which may be utilized for defining a single wavelength connection that may comprise multiple spectral components. It should be appreciated that the example embodiments define a spectrum slot based on an absolute (or global) frequency, where two fields are used to specify the starting frequency and the ending frequency. Thus, the example embodiments provide an SSL featuring a frequency/wavelength definition by establishing an absolute starting and ending point for the each spectral allocations. The configuration presented by the example embodiments allows for off-grid spectral allocation and further provides a solution for eliminating the need for multiple labels for a single wavelength connection featuring multiple signals with a specified spectrum range. Furthermore, connection set-up, tear down, re-arrangement, etc., may be provided in a more efficient manner.

Figure 3:
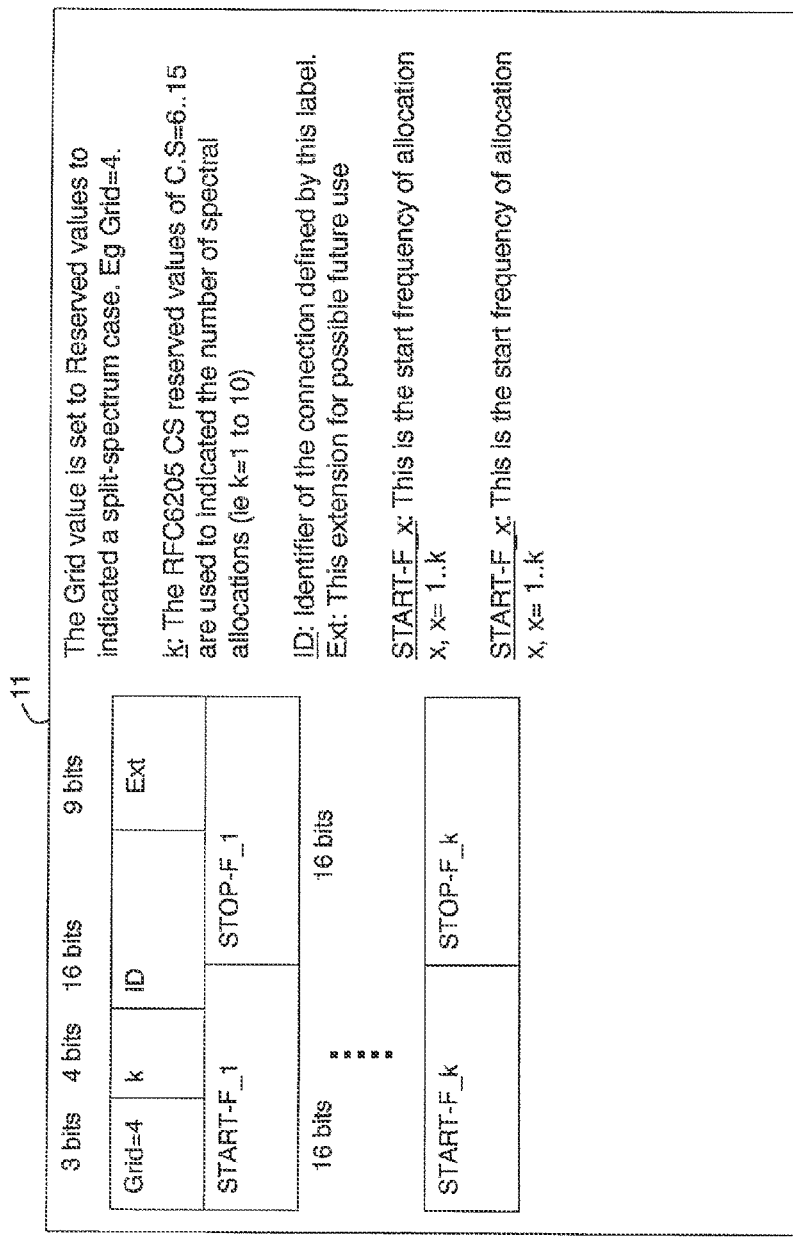
FIG. 3 is an example of a split spectrum label, according to some of the example embodiments.

FIG. 3 illustrates a SSL 11 according to some of the example embodiments. The SSL 11 comprises START-F_k and STOP-F_k values for each of the spectral allocations. START-F_k defines an absolute starting point for a respective spectral allocation and STOP-F_k defines an absolute ending point for a respective spectral allocation, where k is the value (1, 2, 3, etc.) for the number of spectral allocations of the connection. According to some of the example embodiments, the START and STOP values may be defined by the revised G.694.1 ITU-T grid with the following equation, Frequency (THz)=193.1 THz+n*ΔF, where ΔF=0.00625. It should be appreciated that smaller values of ΔF may be utilized, for example, 3.125 GHz, etc. It should also be appreciated that the first field of the label 'Grid' may be used to indicate a split-spectrum case.

Thus, the example embodiments presented herein allow for a single connection to take multiple spectrum slots by using a multiple number of starting and ending definitions (e.g., START-F_k, STOP-F_k). This is a compact expression to support a single connection to be split into multiple spectrum components, either in spectrum domain and/or over different optical paths. This provides necessary information to assemble the multiple spectrum components at the end node. It should be appreciated that there are no explicit means for specifying how this case would be handled in current solutions.

The example embodiments presented herein may be viewed as an inverse multiplexing technique both in terms of lambda channels and optical path. One connection may be carried out by multiple lambdas (e.g., each lambda may have a flexible spectral width defined by START-F_k and STOP-F_k). It should be appreciated that not all lambdas need to be carried on a same route. Each individual lambda may use different routes.

Figure 4:
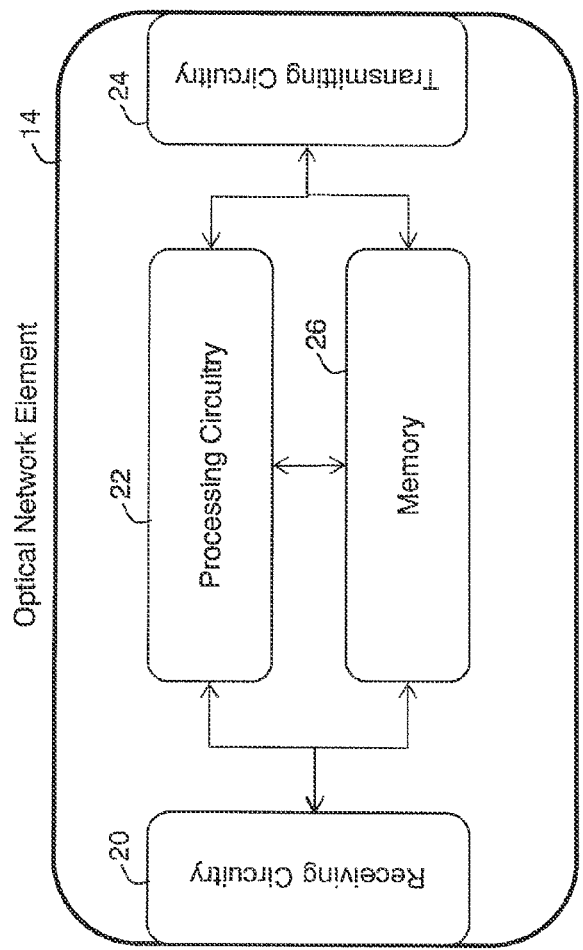
FIG. 4 is an example configuration of an Optical Network Element, according to some of the example embodiments.

FIG. 4 illustrates an example Optical Network Element (ONE) 14 that may utilize the example embodiments discussed herein. The ONE node 14 may comprise any number of communication ports or circuitry, for example receiving circuitry 20 and transmitting circuitry 24. The communication ports or circuitry may be configured to receive and transmit any form of communications data or instructions. It should be appreciated that the ONE node 14 may alternatively comprise a single transceiver port or circuitry. It should further be appreciated that the communication or transceiver port or circuitry may be in the form of any input/output communications port or circuitry known in the art.

The ONE node 14 may further comprise at least one memory unit 26. The memory unit 26 may be configured to store received, transmitted, and/or measured data of any kind and/or executable program instructions. The memory unit 26 may be any suitable type of computer readable memory and may be of a volatile and/or non-volatile type.

The ONE node 14 may also comprise processing circuitry 22 that may be configured to establish a plurality of optical routes based on information received in a SSL 11. It should be appreciated that the processing circuitry 22 may be any suitable type of computation unit, e.g. a microprocessor, digital signal processor (DSP), field programmable gate array (FPGA), or application specific integrated circuit (ASIC). It should also be appreciated that the processing circuitry 22 need not be comprised as a single unit. The processing circuitry 22 may be comprised as any number of units or circuitry.

Figure 5:
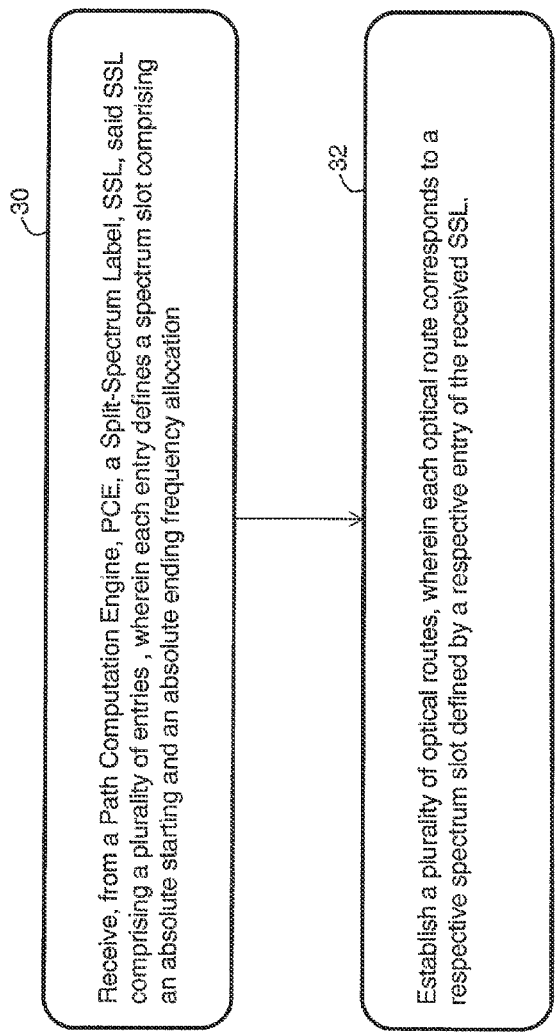
FIG. 5 is a flow diagram depicting example operations which may be taken by the Optical Network Element of FIG. 4.

FIG. 5 illustrates a flow diagram depicting example operations which may be taken by the ONE node 14 of FIG. 4.

Operation 30

The ONE node 14 receives 30, from a Path Computation Engine (PCE) 12, a Split-Spectrum Label (SSL) 11. The SSL 11 comprises a plurality of entries and a plurality of definitions for spectral slots. Each entry defines a spectrum slot comprising an absolute starting and an absolute ending frequency allocation. The receiving circuitry 20 is configured to receive the SSL 11.

As should be appreciated by the SSL 11 featured in FIG. 3, the SSL 11 may feature any number of spectral slot definitions (e.g., numbered 1-x), where START-F_1 and STOP-F_1 defines the absolute starting and absolute ending frequency allocation of the spectral slot corresponding to an index number of 1 (x=1). START-F_k and STOP-F_k defines the absolute starting and absolute ending frequency allocation of the spectral slot corresponding to an index number of k (x=k). It should be appreciated that the SSL 11 may feature any number of spectral slot definitions corresponding to any number of connections or optical routes. It should further be appreciated that the plurality of optical routes may correspond to a single wavelength connection.

It should also be appreciated that at least a sub-set of spectrum slots, described by the entries of the SSL 11, may be spectrally and/or spatially non-adjacent. Specifically, the spectral slots (corresponding to a single connection) need not be adjacent in terms of frequency. Furthermore, the spectral slots need not be comprised in a same optical route or a near-by or adjacent optical route. Thus, the spectral slots may be spatially non-adjacent. It should also be appreciated that the SSL 11 may be received via Resource Reservation Protocol (RSVP) signaling. It should be appreciated that the PCE 12 may be a network node, a network management station, and/or any dedicated computational platform.

Operation 32

The ONE node 14 also establishes 32 a plurality of optical routes, wherein each optical route corresponds to one spectral slot defined by a respective entry of the plurality of entries, of the received SSL 11. The processing circuitry 22 is configured to establish the plurality of optical routes.

It should be appreciated that at least one spectral slot may be established such that the at least one spectral slot is located off of an International Telecom Union (ITU) frequency grid. According to some of the example embodiments, the absolute starting and absolute ending frequency allocation of each respective spectrum slot may define an integer number of a spectral width w, wherein $w=k*(193.1 \text{ THz}+n*\Delta F)$, where n is a nominal center frequency of a transmission channel, $\Delta F$ is channel spacing, and k is a non-zero integer. According to some of the example embodiments, $\Delta F$ may be 100, 50, 12.5, 6.25, and/or 3.125 GHz. According to some example embodiments, $\Delta F$ may be less than 3.125 GHz. It should be appreciated that not all spectral slots, corresponding to a same connection, need to have the same $\Delta F$ value or the same spectral width. Therefore, according to some of the example embodiments, at least a sub-set of spectrum slots, described by a corresponding sub-set of the plurality of entries, comprise different spectral widths.

The foregoing description of embodiments of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in an Optical Network Element, ONE, node, for establishing multiple spectral routing in an optical transport network, the method comprising:
   receiving, from a Path Computation Engine, PCE, a Split-Spectrum Label, SSL, said SSL comprising a plurality of entries and a plurality of definitions for spectral slots, wherein each entry defines a spectrum slot comprising an absolute starting and an absolute ending frequency allocation and wherein a first field of the SSL is labelled as grid; and
   establishing a plurality of optical routes corresponding to a single wavelength connection in the optical transport network, wherein each optical route corresponds to one spectrum slot defined by a respective entry, of the plurality of entries, of the received SSL,
   wherein at least a sub-set of non-contiguous spectrum slots, described by a corresponding sub-set of the plurality of entries, comprise different spectral widths, and
   wherein at least a sub-set of the non-contiguous spectrum slots that comprise different spectral widths are spatially non-adjacent,
   wherein the absolute starting and absolute ending frequency allocation of each respective spectrum slot is associated with a $\Delta F$ that is less than 3.125 GHz.

2. The method of claim 1, wherein at least a sub-set of spectrum slots, described by a corresponding sub-set of the plurality of entries, are spectrally non-adjacent.

3. The method of claim 2, wherein the sub-set of spectrum slots that are spectrally and/or spatially non-adjacent allows the sub-set of spectrum slots not to be comprised in one optical route or an adjacent optical route.

4. The method of claim 1, wherein the SSL is received via Resource Reservation Protocol, RSVP, signalling.

5. The method of claim 1, wherein at least one spectrum slot is located off of an International Telecom Union, ITU, frequency grid.

6. The method of claim 1, wherein a transmission channel, associated with the SSL, has a nominal center that is an exact value.

7. The method of claim 1, wherein the SSL eliminates multiple labels for a single wavelength connection featuring multiple signals with a specified spectrum range.

8. The method of claim 1, wherein the grid indicates that a label is a SSL.

9. The method of claim 8, wherein a second field of the SSL is labeled k which indicates the number of spectral allocations of a single wave connection.

10. The method of claim 1, wherein the spectrum slot defines a single spectrum component, wherein a next spectrum slot defines another single spectrum component which is not spectrally and/or spatially non-adjacent to the spectrum slot.

11. The method of claim 1, wherein at least a sub-set of spectrum slots, described by a corresponding sub-set of the plurality of entries, are spectrally and spatially non-adjacent.

12. The method of claim 1, wherein the first field of the SSL labelled as grid is associated with a plurality of additional fields containing slot width parameters including at least a number of spectral allocations and a channel spacing.

13. An Optical Network Element, ONE, node, for establishing multiple spectral routing in an optical transport network, the ONE node comprising:
    receiving circuitry configured to receive, from a Path Computation Engine, PCE, a Split-Spectrum Label, SSL, said SSL comprising a plurality of entries and a plurality of definitions for spectral slots, wherein each entry defines a spectrum slot comprising an absolute starting and an absolute ending frequency allocation and a first field of the SSL is labelled grid; and
    processing circuitry configured to establish a plurality of optical routes corresponding to a single wavelength connection in the optical transport network, wherein each optical route corresponds to one spectrum slot defined by a respective entry, of the plurality of entries, of the received SSL,
    wherein at least a sub-set of non-contiguous spectrum slots, described by a corresponding sub-set of the plurality of entries, comprise different spectral widths, and
    wherein at least a sub-set of the non-contiguous spectrum slots that comprise different spectral widths are spatially non-adjacent,
    wherein the absolute starting and absolute ending frequency allocation of each respective spectrum slot is associated with a $\Delta F$ that is less than 3.125 GHz.

14. The ONE node of claim 13, wherein at least a sub-set of spectrum slots, described by a corresponding sub-set of the plurality of entries, are spectrally non-adjacent.

15. The ONE node of claim 13, wherein the SSL is received via Resource Reservation Protocol, RSVP, signalling.

16. The ONE node of claim 13, wherein at least one spectrum slot is located off of an International Telecom Union, ITU, frequency grid.

17. The ONE node of claim 13, wherein the PCE is a network node, network management station and/or a dedicated computational platform.

* * * * *